T. WANG.
CITRUS FRUIT WASHER AND DRIER.
APPLICATION FILED APR. 5, 1919.

1,319,541. Patented Oct. 21, 1919.
2 SHEETS—SHEET 1.

Witnesses

Inventor
T. Wang.
By Victor J. Evans
Attorney

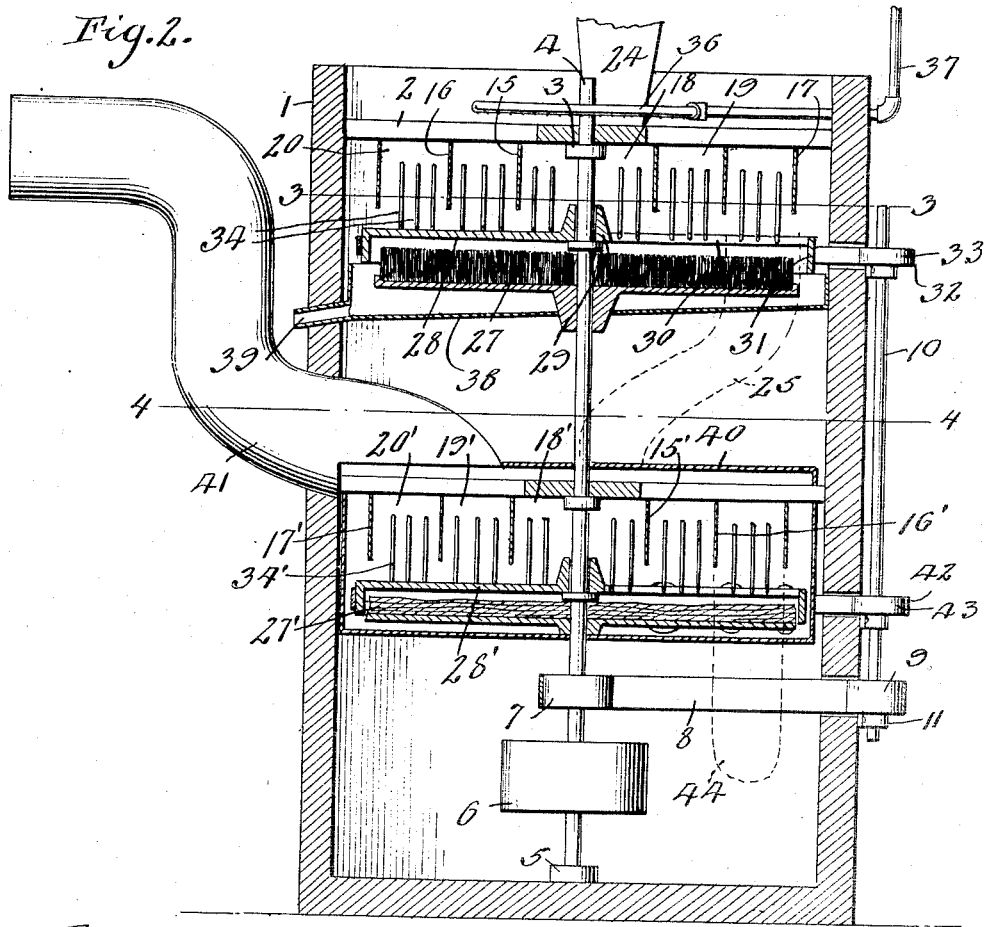
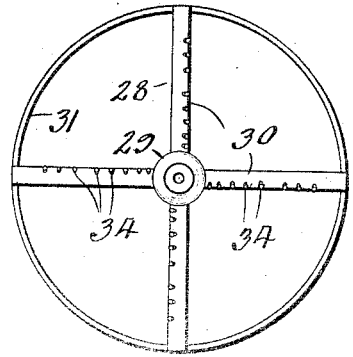
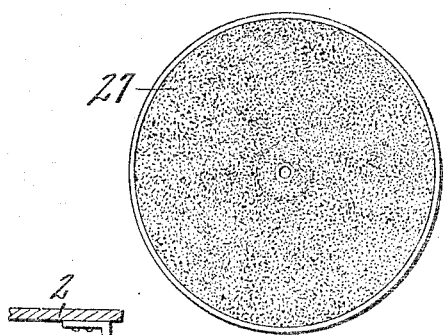
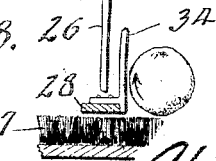

UNITED STATES PATENT OFFICE.

THEODORE WANG, OF CLEARWATER, FLORIDA.

CITRUS-FRUIT WASHER AND DRIER.

1,319,541.  Specification of Letters Patent.  Patented Oct. 21, 1919.

Application filed April 5, 1919. Serial No. 287,788.

*To all whom it may concern:*

Be it known that I, THEODORE WANG, a citizen of the United States, residing at Clearwater, in the county of Pinellas and State of Florida, have invented new and useful Improvements in Citrus-Fruit Washers and Driers, of which the following is a specification.

My invention relates to a citrus fruit washer and drier, the object of the invention being to provide a machine wherein oranges and like citrus fruit may be rapidly and efficiently washed and dried without injury and in an economical manner.

The invention consists of the features of construction, combination and arrangement of parts herein fully described and claimed, reference being had to the accompanying drawings in which:—

Fig. 2 is a central vertical section through the same.

Fig. 6 is a top plan view of the rotary feeder.

Fig. 7 is a similar view of the rotary brush.

Fig. 8 is a detail view showing on an enlarged scale the relative arrangement of the stationary fingers on the casing and the fingers on the rotary feeder, and illustrating the action of the brush in bringing the fruit in contact with the second named fingers.

Figure 1:
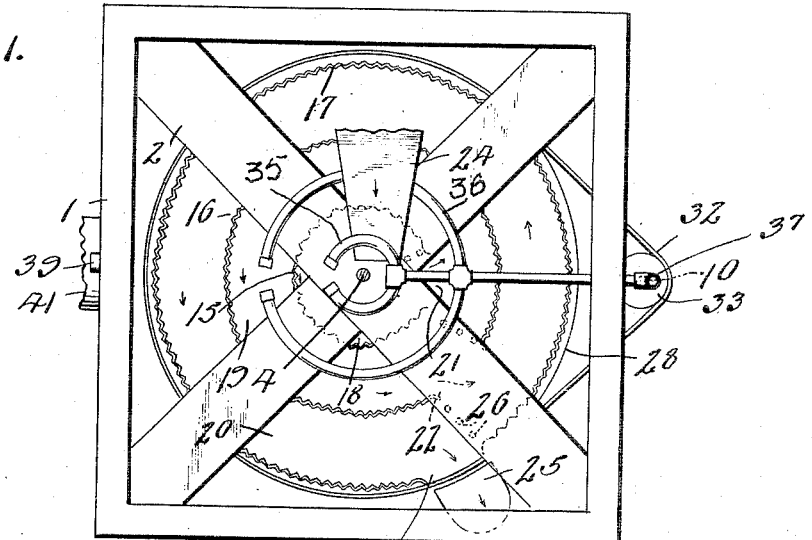
Figure 1 is a top plan view of a fruit washer and drier embodying my invention.
Figure 3:
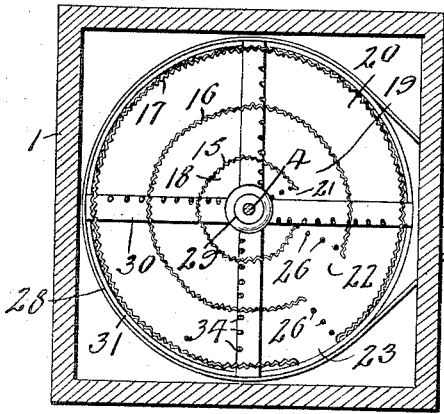
Fig. 3 is a horizontal transverse section on the line 3—3 of Fig. 2.
Figure 5:
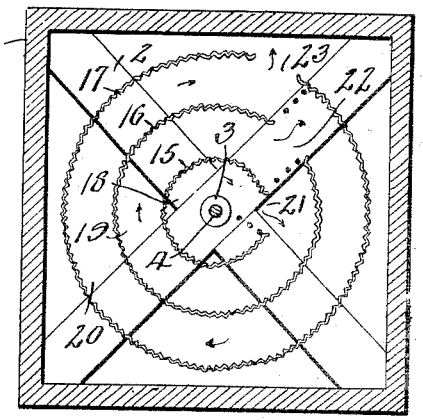
Fig. 5 is a horizontal transverse section taken on a plane below the line 3—3 of Fig. 2 looking upward to show the circular partitions or chambers, the feeder fingers being omitted.
Figure 4:
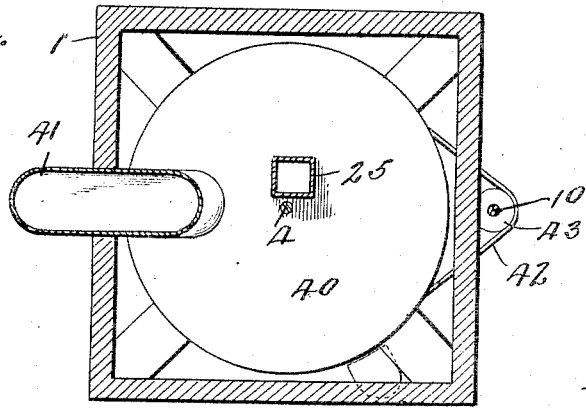
Fig. 4 is a similar view on the line 4—4 of Fig. 2.

Referring to the drawings, 1 designates a suitable vertically disposed frame or casing, open at the top, except for the provision of bars or strips 2 extending between the corners of the casing and crossed X-fashion, the lapping portions of the bars being perforated to provide a bearing 3 for the upper end of a vertically disposed shaft 4 extending centrally within the casing and journaled at its lower end in a suitable bearing 5. The shaft 4 is provided with a pulley 6 by which it may be driven from a suitable source of power and is also provided with a pulley 7 connected by a belt 8 with a pulley 9 on a transmission shaft 10, journaled in suitable bearings 11 on the exterior of the casing.

Depending from the head bars 2 are appropriately annular strips or partitions 15, 16 and 17 arranged in spaced, concentric relation to provide annular channels 18, 19 and 20, having outlets 21, 22 and 23 at different circumferential points. The innermost channel 18 communicates with a feed chute or hopper 24, while the outlet 23 of the outermost channel 20 communicates with a discharge chute 25. Depending from the bars 2 are rows or series of deflecting fingers 26, which project into the respective channels 18, 19 and 20 and are arranged at one side of the respective outlets 21, 22 and 23, so as to provide guards, for a purpose hereinafter described. The partitions 15, 16 and 17 are preferably made of sheet metal or rubber, rubber being preferred, and these partitions may be provided with a corrugated surface so as to have a scrubbing or cleansing action on the fruit.

Fixed to the shaft 4 for rotation therewith is a brush 27, and arranged to rotate about the shaft above the brush and between the same and the partitions 15, 16 and 17 is a feed wheel or device 28, comprising a hub 29, a series of radial arms 30 and a rim 31, which latter project downward in the form of a flange about the upwardly projecting ends of the brush bristles. This flange, in addition to serving as a guard, also forms a pulley around which passes a drive belt 32 which also passes around the pulley 33 on the shaft 10, whereby the rotary feeder is driven. In practice, the brush and feeder are revolved at different relative speeds, the brush being revolved at about 100 revolutions per minute, while the feed wheel is revolved at about 18 revolutions per minute, this difference in speed being employed for the purpose of effecting a turning over of the oranges and the other fruit under treatment so that all surfaces thereof will be exposed to the action of the washing and cleansing devices. As shown, the arms or spokes of the feed wheel are provided with rows of upwardly extending fingers 34 which are arranged to rotate in the channels 18, 19 and 20 and are adapted to move through the spaces or fingers 26 so as to avoid interference therewith. The fingers 26 and 34 may be of any suitable rigid or semi-flexible material. It will be observed that the radial spaces between the spokes 30 of the feed wheel overlie the brush bristles and communicate with the open bottoms of the channels 18, 19 and 20. Arranged above the head bars 2 are partially circular water spray pipes 35 and 36, communicating with a water supply pipe 37, said spray pipes being provided with nozzles or jet apertures for feeding water to the channels 18 and 19, but not to the channel 20, which water is supplied to the body of the fruit and to the brush bristles. The brush rotates within a collecting pan 38 which is designed to receive the waste water and dirt removed from the fruit, said pan being provided with a drain outlet 39.

In the operation of the device as thus far described, water from the spray device is permitted to drip down into the two innermost cleansing channels, and a fruit to be cleansed is fed into the innermost channel 18 through the hopper or inlet 24. This fruit rests upon the innermost portions of the spokes 30 of the feed wheel and come into contact with the innermost brush bristles, and in the rotation of the feed wheel and brush the fruit is carried around the channel 18 until the outlet 21 is reached, through which the fruit passes into the channel 19, and is carried around said channel in like manner and discharged through the outlet 22 into the channel 20, carried around said channel and finally discharged through the outlet 23 into the discharge chute 25. The fruit is moistened by the waste dripping from the spray pipes and the dirt thereon loosened, as the fruit is carried around by the fingers 34 it comes in contact with the corrugated walls 15, 16 and 17 of the channels, which exert a gentle rubbing action thereon, and at the same time fruit is disposed in the spaces between the spokes 30 of the feed wheel and rides in contact with the brush bristles, by which the surfaces thereof are thoroughly brushed and cleansed, all the dirt being washed off by the drip water and passing therewith into the collecting pan 38 for discharge. The outermost channel and outermost portions of the brush bristles are not directly supplied with water, for the reason that it is desirable at this stage to relieve the fruit from as much surface moisture as possible, since the cleansing action is practically performed, the adhering moisture being largely driven from the surface of the fruit by the action of the brush as well as the centrifugal forces due to their rapid rotation. In the passage of the fruit through the cleansing devices just described, it will be apparent that the fruit will be removed of all surface dirt and foreign particles which adhere thereto, and will be discharged through the chute 25 in a thoroughly cleansed condition.

For the purpose of drying and polishing the surface of the fruit, I provide below the aforesaid cleansing devices a set of drying devices, which are similar in all respects in construction to the cleansing devices and mounted in the same manner, except that the channel forming partitions 15, 16 and 17 are supported in a pendent position from the top of a drying box or chamber 40, and with the further explanation that the acting surfaces of all the parts are composed of felt or some other comparatively soft, and preferably absorbent, moisture collecting and polishing material. In place of felt, leather or the like may be used. The parts of the drying mechanism corresponding to those of the cleansing mechanism are designated by similar primed reference numerals. While the use of absorbent material is preferred, I also preferably employ suitable drying means, such as hot air which may be conducted to the drying chamber 40 through a pipe 41 from a suitable source of supply. In the event of the surfaces of the acting parts being made of a soft flexible material which is non-absorbent, the drying action of the current of air may be relied upon to dissipate the moisture from the fruit, in which event the acting elements will operate simply to circulate the fruit to expose the surfaces thereof to the drying medium and also incidentally to polish the same. The feed wheel of the drying mechanism is driven by the belt 42 from a pulley 43 on the shaft 10, while the brushing element 27′, like the brush 27 of the cleansing mechanism, is fixed to the shaft 4 for rotation therewith. The innermost channel 18′′ of the drying mechanism communicates with the lower end of the inclined chute 25, whereby the fruit after being cleansed passes by gravity from the cleansing mechanism to the drying mechanism, an outlet 44 from the drying mechanism being provided for final discharge into a suitable receptacle. The belt 42 passes through suitable openings in the chamber 40, which may also serve as hot air outlets.

From the foregoing description, taken in connection with the drawings, the construction and mode of operation of my improved apparatus for washing and drying oranges and other citrus fruit will be readily understood, and it will be seen that the invention provides an apparatus of this character which is simple of construction, rapid and efficient in action and adapted to permit the fruit to be economically treated without injury thereto.

Having thus described the invention, what is claimed as new, is:—

1. An apparatus of the character described comprising a frame or casing, a series of fruit circulating channels having walls provided with cleansing surfaces, an open feed wheel disposed below said channels and provided with feed devices for feeding the fruit through the channels, a cleansing element disposed below the open feed wheel, and means for rotating the feed wheel and cleansing element.

2. An apparatus of the character described comprising a frame or casing, a series of annular concentric channels having outlets at different points and open at their lower ends, said channels having walls provided with cleansing surfaces, an open feed wheel disposed below said channels, fingers projecting from the feed wheel into the said channels, a cleansing device disposed below the open feed wheel and having a cleansing surface, and means for rotating said feed wheel and cleansing device.

3. An apparatus of the character described comprising a frame or casing, a concentric series of annular channels provided with outlets at different points and having cleansing surfaces, spaced fingers within the channels at one side of the outlets thereof, an open feed wheel disposed below said channels, fingers projecting upwardly from the feed wheel into channels, a cleansing device disposed below the feed wheel and having a cleansing surface exposed therethrough, and means for rotating the feed wheel and cleansing device.

4. An apparatus of the character described comprising a frame or casing, a concentric series of annular channels having inlets and outlets at different points and open at their lower ends, said channels being provided with cleansing surfaces, an open work feed wheel disposed below said channels, and fingers carried by the wheel and projecting upwardly into the channels, a rotary brush disposed below the feed wheel, and means for rotating the feed wheel and brush at different speeds.

5. An apparatus of the character described comprising a frame or casing, a series of concentric annular channels provided with inlets and outlets at different points and open at their lower ends, said channels having cleansing surfaces, an open work feed wheel disposed below said channels and having fingers projecting upwardly thereinto, the brush arranged for rotation beneath the feed wheel, means for supplying water to certain of said channels, means associated with the brush for collecting the waste water, and means for rotating the feed wheel and brush at different speeds.

6. An apparatus of the character described comprising a frame or casing, a vertical shaft, a series of annular concentric channels having inlets and outlets at different points, said channels being open at their lower ends and provided with cleansing surfaces, means for feeding water to certain of said channels, an open work feed wheel disposed beneath the channels and having fingers projecting upwardly thereinto, said wheel being mounted to rotate loosely upon the shaft, a brush disposed below the feed wheel and fixed to the shaft for rotation therewith, a drive element receiving motion from the shaft, and means for driving the feed wheel therefrom at a lower rate of speed than the brush.

7. An apparatus of the character described including a frame or casing, a vertical shaft disposed therein, washing and drying devices arranged at different elevations upon the frame or casing, each set of devices comprising a series of annular concentric channels having inlets and outlets at different points, an open work feed wheel disposed beneath the channels and having feed fingers projecting upwardly thereinto, and a rotary cleansing element disposed beneath the feed wheel, said wheel being loosely mounted on the shaft and said cleansing element being fixed to the shaft in rotation therewith, means for supplying water to certain of the channels of the cleansing mechanism, means for collecting the waste water and impurities therefrom, means for for subjecting the fruit under treatment by the drying mechanism to the action of a drying agent, a shaft driven from the first named shaft, and driving connections between said shaft and the feed wheels of the cleansing and drying mechanism.

In testimony whereof I affix my signature.

THEODORE WANG.